F. B. CARLISLE.
TREAD FOR VEHICLE TIRES.
APPLICATION FILED JUNE 16, 1917.

1,400,263. Patented Dec. 13, 1921.

WITNESSES

INVENTOR
Fred B. Carlisle

ATTORNEYS

UNITED STATES PATENT OFFICE.

FRED B. CARLISLE, OF DAVISVILLE, RHODE ISLAND, ASSIGNOR TO JOSEPH M. GILBERT, OF NEW YORK, N. Y.

TREAD FOR VEHICLE-TIRES.

1,400,263.

Specification of Letters Patent.

Patented Dec. 13, 1921.

Application filed June 16, 1917. Serial No. 175,083.

*To all whom it may concern:*

Be it known that I, FRED B. CARLISLE, a citizen of the United States, and resident of Davisville, county of Kent, State of Rhode Island, have invented a certain new and useful Improvement in Treads for Vehicle-Tires, of which the following is a specification.

My invention relates to improvements in treads for vehicle tires and more particularly to treads for tires intended for motor-propelled vehicles and has for its object to provide a tread whereby the efficiency of the tire, particularly as to traction, is increased to a maximum extent. My invention will be fully described hereinafter and the features of novelty will be pointed out in the appended claims.

Figure 1:
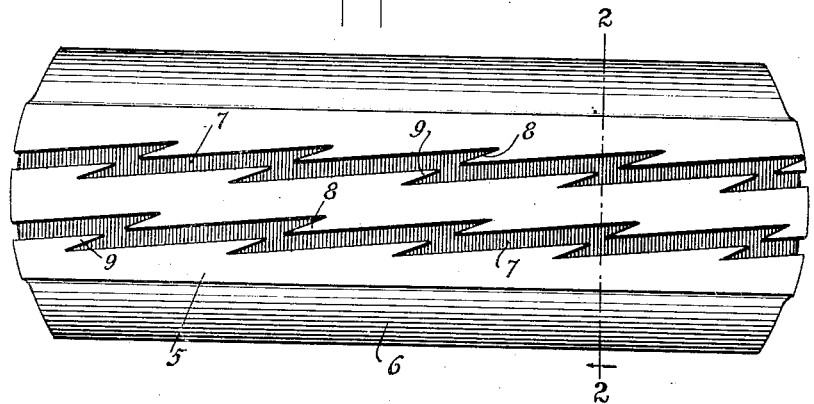
Figure 2:
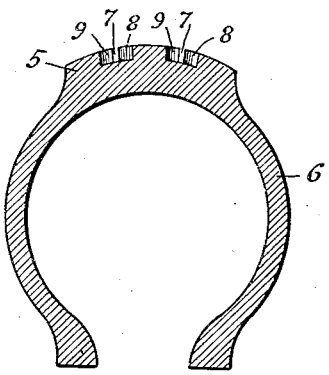
Figure 3:
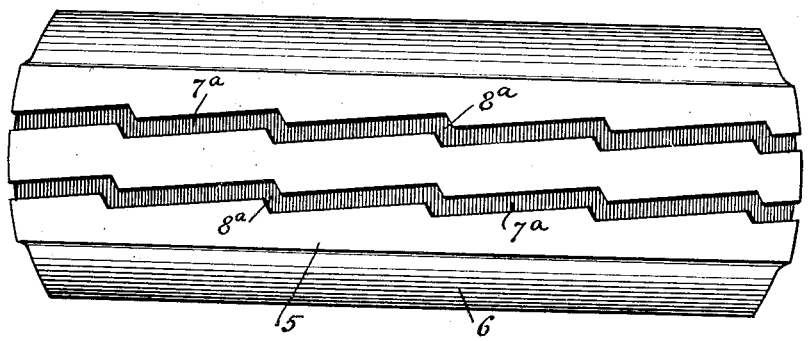

In the accompanying drawings, which illustrate examples of my invention, Figure 1 is a face view of a section of a pneumatic tire shoe provided with my improved tread; Fig. 2 is a cross-section thereof on the line 2—2 of Fig. 1; and Fig. 3 is a face view similar to Fig. 1 showing another form of my invention.

In the preferred form, the arrangement comprises a pair of grooves which extend circumferentially about the customary tread portion 5 of the tire 6. Each groove comprises sections 7 which extend at a relatively slight angle to the peripheral center line of the tire, the position of each groove section with respect to said center approaching parallelism without, however, being actually parallel therewith. As shown in Figs. 1 and 2, the opposed ends of adjacent groove sections 7 overlap and are off-set with respect to each other; the ends of the walls of said sections being connected by inclined walls 8 which extend at acute angles to the walls of the sections 7 and form projections 9. The arrangement described produces zig-zag grooves having relatively long legs connected by relatively short legs, thus forming continuous, circumferential grooves practically all parts of which extend in lines diverging from parallelism with the plane in which the tire lies.

With this arrangement the sections 7 of the grooves, by reason of their positions at an angle to the peripheral center line of the tire, serve to grip the road with a gradual and continuous wedging action from one end of each section 7 to the other end thereof as the tire revolves. The engagement of each portion of the tread with the road and its removal therefrom during rotation is gradual and without resistance so that a wheel equipped with a tire having my improved tread is easily operated. This lack of resistance is due to the position of the groove sections 7 with respect to the peripheral center line of the tire, which arrangement also serves to hold the tire upon the road regardless of the speed of rotation.

The projections 9 being relatively small and slight, are flattened out or spread, as it were, under the load and are consequently not worn down to any appreciable extent. As a matter of fact, after the tire has been in use, the projections 9, when not under load, will project somewhat beyond the adjacent portions of the tread which have become worn down.

In Fig. 3 I have shown a slightly different arrangement of grooves; in this form the sections 7ª, which correspond to the sections 7 of Fig. 1, do not overlap at opposed ends and are connected by short sections 8ª extending at obtuse angles to the sections 7. The sections 7ª also approach a position of parallelism with the peripheral center line of the tire while the shorter sections are inclined in the opposite directions at greater angles to said center line.

In all forms of my invention the main sections of the groove or grooves, of whatever form they may be within my inventive idea, extend at a comparatively slight inclination relatively to the peripheral center line of the tire; the angle of this inclination is never move than 35° and, generally speaking, is considerably less.

My improved tread increases the efficiency of the tire, particularly as to traction, to a maximum extent.

Various changes in the specific forms shown and described may be made within the scope of the claims without departing from the spirit of my invention.

I claim:

1. A tire having a tread provided with circumferentially extending grooved portions which taken as a whole form a zigzag depression parallel with the circumferential center line of the tire, said grooves being constituted of a series of relatively narrow inclined grooves, substantially straight throughout their entire length, each of which approaches parallelism with the peripheral center line of the tire, diverging nevertheless, but only slightly, therefrom and of a series of short transverse indentations of approximately equal depth and approximately equal in major length to twice the width of said inclined grooves and connecting said inclined grooves end to end and causing the formation of walls approximately equal in width to that of the grooves to be interposed at the overlapping end of each of the inclined grooves without interrupting the continuity of the grooves in that region.

2. A tire having a tread provided with a circumferentially extending groove, said groove comprising relatively long narrow sections, substantially straight throughout their entire length, each diverging but only slightly from parallelism with the peripheral center line of the tire, said long sections having opposed ends out of registry with and overlapping each other and communicating with each other at the overlap whereby walls approximately equal to the width of the groove are interposed at the overlapping end of each of the long sections without interrupting the continuity of the groove in the region of the overlap.

3. A tire having a tread provided with a circumferentially extending groove comprising relatively long sections, substantially straight throughout their entire length, arranged with corresponding inclinations approaching parallelism with the peripheral center line of the tire and having opposed ends out of registry with each other in a circumferential direction and contiguous in a transverse direction and relatively short transverse indentations connecting said opposed ends of the long sections whereby walls approximately equal to the width of the groove are interposed at the transversely contiguous ends of the long sections, said walls comprising angular projections having their apices extending toward each other in the groove without interrupting the continuity of the groove in that region.

4. A tire having a tread provided with a circumferentially extending groove, said groove being made up of a consecutive series of narrow relatively long slots, substantially straight throughout their entire length, each of which diverges but only to a slight extent from parallelism with the peripheral center line of the tire and relatively short but equally deep indentations connecting the end of one long slot where closest to the center line of the tire with the end of the next long slot where farthest away from the center line so as to form oppositely disposed resilient angular projections in the slot transverse to the line of travel of the wheel.

In testimony whereof I have hereunto set my hand.

FRED B. CARLISLE.